(12) United States Patent
Haghighat et al.

(10) Patent No.: US 11,520,501 B2
(45) Date of Patent: Dec. 6, 2022

(54) AUTOMATED LEARNING TECHNOLOGY TO PARTITION COMPUTER APPLICATIONS FOR HETEROGENEOUS SYSTEMS

(71) Applicant: Intel Corporation, Santa Clara, CA (US)

(72) Inventors: Mohammad R. Haghighat, San Jose, CA (US); Sara Baghsorkhi, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 534 days.

(21) Appl. No.: 16/722,778

(22) Filed: Dec. 20, 2019

(65) Prior Publication Data

US 2020/0133537 A1    Apr. 30, 2020

(51) Int. Cl.
| | | |
|---|---|---|
| *G06F 3/06* | (2006.01) | |
| *G06N 20/00* | (2019.01) | |
| *G06F 9/50* | (2006.01) | |
| *H04L 41/5003* | (2022.01) | |
| *H04L 41/50* | (2022.01) | |

(52) U.S. Cl.
CPC .......... *G06F 3/0631* (2013.01); *G06F 3/0611* (2013.01); *G06F 3/0679* (2013.01); *G06F 9/50* (2013.01); *G06N 20/00* (2019.01); *G06F 9/5027* (2013.01); *G06F 9/5038* (2013.01); *G06F 9/5083* (2013.01); *G06F 9/5094* (2013.01); *H04L 41/50* (2013.01); *H04L 41/5003* (2013.01)

(58) Field of Classification Search
CPC .... G06F 3/0631; G06F 3/0611; G06F 3/0679; G06F 9/50; G06F 9/5027; G06F 9/5038; G06F 9/5083; G06F 9/5094; G06N 20/00; H04L 41/50; H04L 41/5003
See application file for complete search history.

(56) References Cited

U.S. PATENT DOCUMENTS

| | | | |
|---|---|---|---|
| 10,990,445 B2 * | 4/2021 | Earl | G06F 9/5005 |
| 11,245,538 B2 * | 2/2022 | Doshi | G06F 16/90339 |
| 2009/0198766 A1 * | 8/2009 | Chen | G06F 9/45558 718/1 |
| 2011/0035802 A1 * | 2/2011 | Arajujo, Jr. | G06F 11/079 718/1 |
| 2014/0173614 A1 * | 6/2014 | Konik | G06F 9/5005 718/104 |
| 2017/0031622 A1 * | 2/2017 | Nagarajan | G06F 3/0607 |
| 2019/0042312 A1 * | 2/2019 | Earl | G06F 9/30123 |
| 2020/0136994 A1 * | 4/2020 | Doshi | H04L 41/0893 |
| 2021/0248006 A1 * | 8/2021 | Earl | G06F 9/505 |

* cited by examiner

*Primary Examiner* — Sargon N Nano
(74) *Attorney, Agent, or Firm* — Jordan IP Law, LLC

(57) ABSTRACT

Systems, apparatuses and methods may provide for technology that identifies a prioritization data structure associated with a function, wherein the prioritization data structure lists hardware resource types in priority order. The technology may also allocate a first type of hardware resource to the function if the first type of hardware resource is available, wherein the first type of hardware resource has a highest priority in the prioritization data structure. Additionally, the technology may allocate, in the priority order, a second type of hardware resource to the function if the first type of hardware resource is not available.

24 Claims, 7 Drawing Sheets

AUTOMATED LEARNING TECHNOLOGY TO PARTITION COMPUTER APPLICATIONS FOR HETEROGENEOUS SYSTEMS

TECHNICAL FIELD

Embodiments generally relate to application partitioning. More particularly, embodiments relate to automated learning technology to partition computer applications for heterogeneous systems.

BACKGROUND

A given computer application (e.g., software) is typically written to be executed on a specific processor (e.g., central processing unit/CPU) in a computing system. As new types of processors (e.g., special-purpose accelerators) are developed, however, enabling the application to execute efficiently on the new processor may involve costly and time-consuming rewrites of the application code. Even if the application is written to execute on a computing system containing a heterogeneous set of processors, enabling the application to execute efficiently on a computing system with a different heterogeneous set of processors may still involve costly and time-consuming rewrites of the application code.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Figure 1:
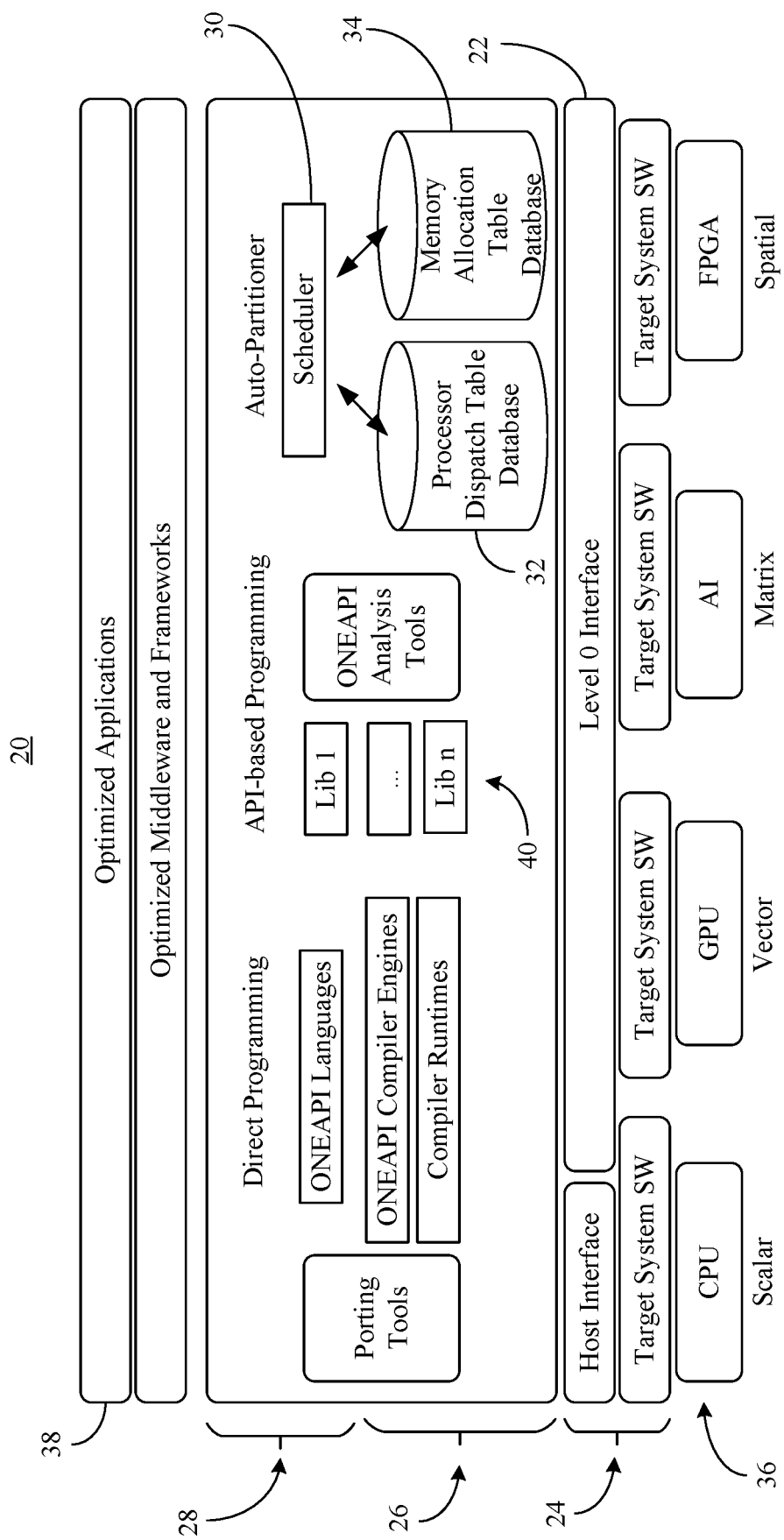
FIG. 1 is a block diagram of an example of a software stack according to an embodiment.

Turning now to FIG. 1, a software stack 20 for a unified programming model such as, for example, ONEAPI, is shown. The illustrated unified software stack 20 includes a level 0 interface 22, system software (SW) 24 below the level 0 interface 22, system software 26 above the level 0 interface 22, and a developer interface 28. The system software 24 below the level 0 interface 22 communicates with a heterogeneous set of processors 36. The heterogeneous set of processors 36 might include hardware such as, for example, a CPU (e.g., which may support scalar operations and/or functions), a GPU (graphics processing unit, e.g., which may support vector operations and/or functions), an AI (artificial intelligence) accelerator (e.g., which might support matrix operations and/or functions), and an FPGA (field programmable gate array, e.g., which may support spatial operations and/or functions). Additionally, the developer interface 28 interacts with optimized middleware and associated frameworks, which in turn support one or more optimized applications 38.

In an embodiment, an auto-partitioner portion of the stack 20 includes a scheduler 30 that maintains prioritization data structures such as, for example, a processor dispatch table (PDT) database 32, a memory allocation table (MAT) database 34, and so forth. In one example, the scheduler 30 uses the prioritization data structures to automatically partition execution of library functions across the heterogeneous set of processors 36. As will be discussed in greater detail, the PDT database 32 may list processor types in priority order and on a per function basis. For example, a set of libraries 40 might include a function that is built for each type of processor in the heterogeneous set of processors 36. In such a case, the illustrated PDT database 32 would specify which processor type has the highest priority for executing the function in question, which processor type has the next highest priority for executing the function in question, and so forth. Similarly, the MAT database 34 may specify which memory type (e.g., cache, volatile memory, non-volatile memory) has the highest storage priority for the function's data structure in question, which memory type has the next highest storage priority for the function's data structure in question. In one example, the prioritization data structures are generated based on telemetry information that is collected during execution of the function. The illustrated prioritization data structures may therefore enhance performance, power/energy efficiency and/or scalability by enabling more optimal execution configurations to be automatically identified on a per function basis. Indeed, by updating the prioritization data structures over time, the illustrated stack 20 provides an automated learning solution to partitioning function execution across the heterogeneous set of processors 36.

Figure 2:
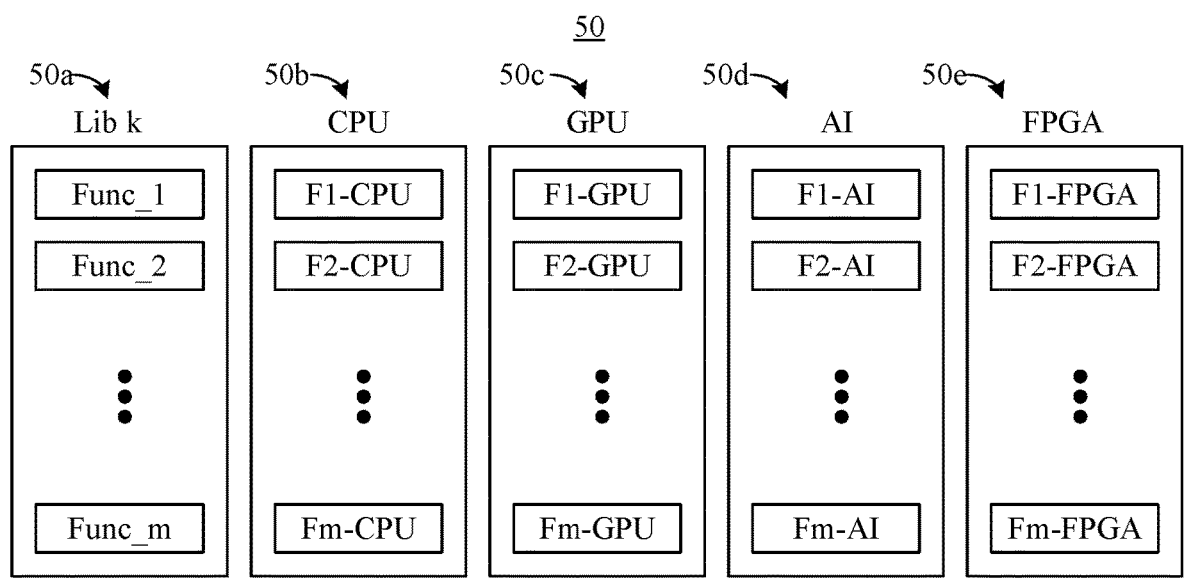
FIG. 2 is a block diagram of an example of a set of library versions according to an embodiment.

FIG. 2 shows a plurality of library versions 50, where a base library 50a ("Lib k") is used to build a CPU library 50b, a GPU library 50c, an AI library 50d and an FPGA library 50e. In the illustrated example, each function ("Func_1" to "Func_m") in the base library 50a has a counterpart in the other versions 50 of the base library 50a. If certain of the library versions 50, or some of the underlying functions, are not available on a given type of processor, such a condition may be indicated to the scheduler and/or an application linker.

Figure 3A:
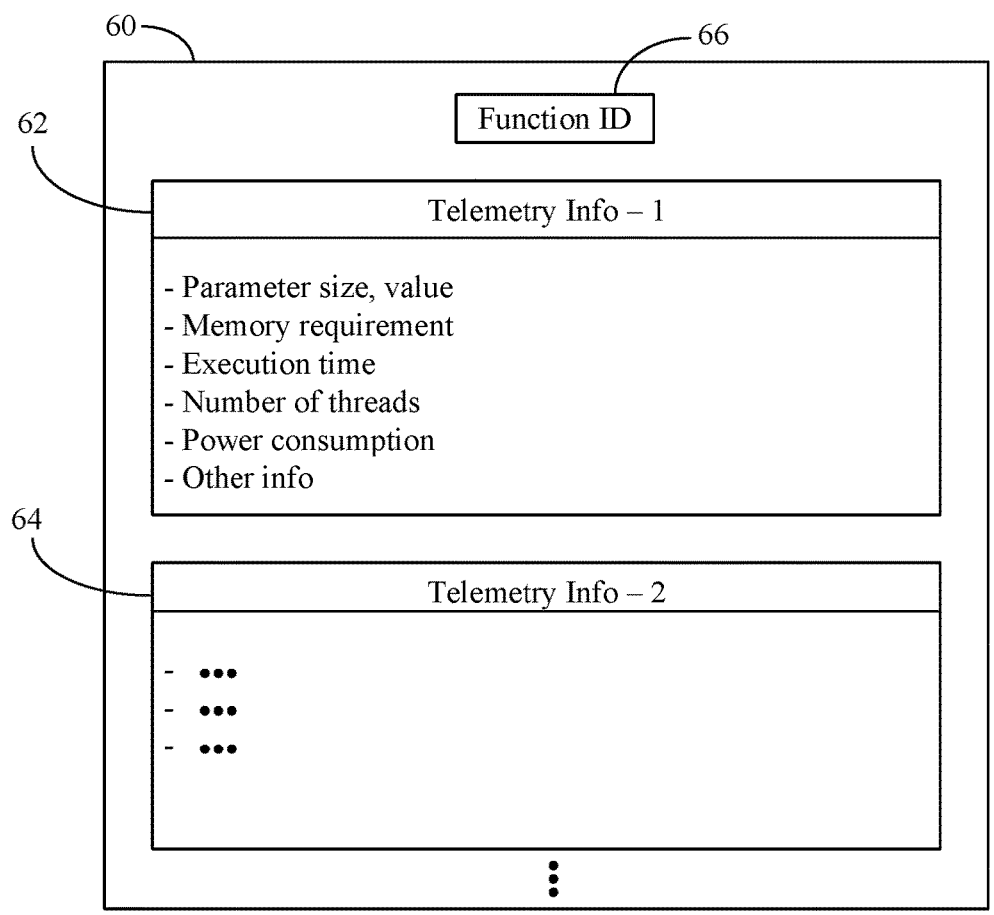
FIGS. 3A and 3B are block diagrams of examples of telemetry data according to embodiments.

FIG. 3A shows an example of telemetry information 60 (e.g., profile information) that includes a function identifier (ID) 66, a first telemetry record 62, a second telemetry record 64, and so forth. The illustrated telemetry records 62, 64 track operating conditions such as, for example, parameter size and value, memory requirements, execution time, the number of threads, power consumption, etc., for successive executions of the function corresponding to the function ID 66. The telemetry records 62, 64 may also document time of day, performance and power profile characteristics of the function execution, and so forth. Information such as utilization of the hardware capabilities (e.g., use of the single instruction multiple data/SIMD vector instructions), utilization of graphics capabilities, and utilization of cache levels in a tiered memory subsystem (e.g., including persistent memory) may also be gathered. In one example, such information is created once during a training session where such profile is gathered.

In other embodiments, the telemetry information 60 is collected repeatedly with execution of the function over time (e.g., selectively or periodically as decided by the user). Thus, the first telemetry record 62 might correspond to a first execution of the function in question, the second telemetry record 64 may correspond to a second execution of the function in question, and so forth. Such an approach may be particularly advantageous in multi-tenant computing architectures where utilization forecasts may not be reliable or predictable. The tracked operating conditions, which may vary from execution-to-execution and from function-to-function, may facilitate the automated generation of prioritization data structures such as, for example, the PDT database 32 (FIG. 1) and/or the MAT database 34 (FIG. 1), already discussed.

Figure 3B:
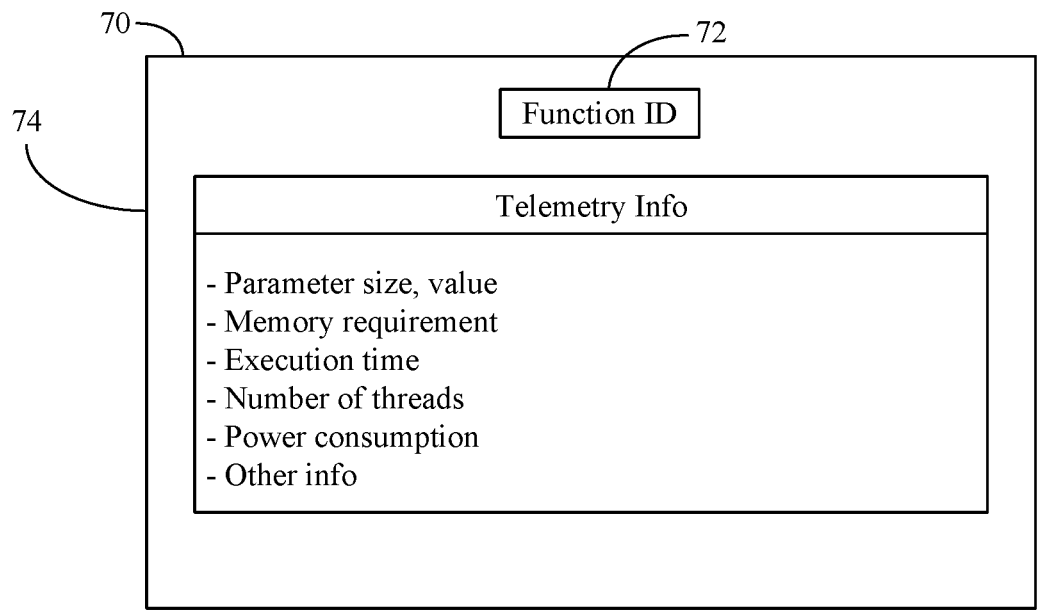

FIG. 3B shows an example of telemetry information 70 that includes a function ID 72 and a single telemetry record 74. The illustrated telemetry record 74 tracks operating conditions such as, for example, parameter size and value, memory requirements, execution time, the number of threads, power consumption, etc., for successive executions of the function corresponding to the function ID 72. Thus, the illustrated solution maintains only the one telemetry record 74 for each function where the record 74 serves as a dynamic data model as the system learns more about the function execution as the function over time. Such an approach may be particularly useful for handling functions that are executed an arbitrarily large number of times. In yet another embodiment, the function may not have any corresponding dynamic profile information, but the system creator may statically provide information about the function such as, for example, an indication of a suggested order of the processor targeting in the scheduling process (e.g., first try a special accelerator, next a particular GPU, and last the CPU).

Figure 4:
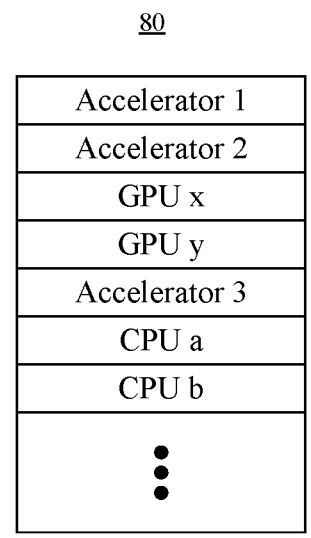
FIG. 4 is a block diagram of an example of a processor dispatch table according to an embodiment.

FIG. 4 shows a processor dispatch table (PDT) 80. As already noted, the function telemetry information may be used to create the PDT 80, which maps the function to a processor in a heterogeneous system. In other embodiments, the profile information might be enhanced, replaced, or overridden by developer/user hints and heuristics. In an embodiment, the PDT 80 specifies the preferred order for targeting a processor of a heterogeneous system for execution of a given function. In a simple embodiment, the PDT 80 is a sorted array where each element is an ID of the target processor. In one embodiment, the first element specifies the highest priority (e.g., most preferred) processor for execution of the given function. In such a case, the second element of PDT designates the second choice of the processor for the execution of the given function, and so on. In the illustrated example, the type of processor with the highest priority is "Accelerator 1," the type of processor with the next highest priority is "Accelerator 2," and so forth. For instance, if the telemetry information corresponding to a function indicates a heavy use of wide vector instructions, such knowledge may be reflected in the priority order of processor choice for execution of the function. In other words, the scheduler might attempt to execute the function on a processor that has relatively wide instructions.

Another type of prioritization data structure is a Memory Allocation (e.g., layout) Table (MAT), which guides the allocation of memory for select data structures of the computation units including the function. In an embodiment, the MAT captures the knowledge of the developer and the dynamic telemetry profile of the functions from previous runs of the application or function. A system agent may analyze the execution characteristics of the previous runs where the select data structure (e.g., a large array or buffer) was mapped to a certain memory unit. In one example, the agent then creates a priority table for memory allocation corresponding to the data structure that will be used by the memory allocator during execution of the application or function. Thus, a prioritized listing of the MAT might be [cache=>RAM=>persistent storage] for a data structure of the function, whereas prioritized listing of the MAT may be [RAM=>persistent storage] for another data structure of the function. Similar to the PDT, the MAT may evolve as the system automatically learns more about the execution characteristics of the application or function. As such, learnings from new runs are used to further improve the behavior of future runs. In certain embodiments, the scope of the MAT expands beyond components of a single computing system to cover architectures such as, for example, disaggregated tiered memory architecture systems.

Figure 5:
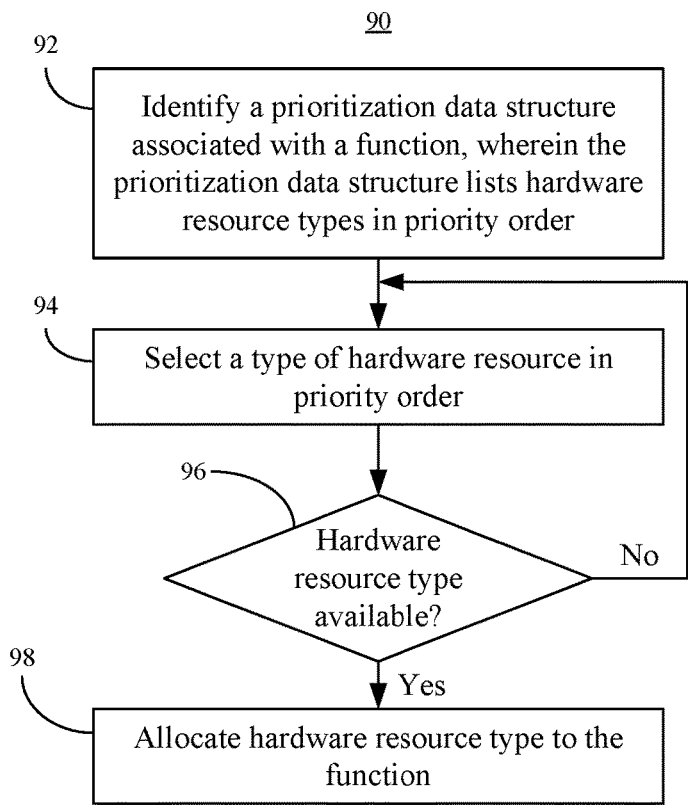
FIG. 5 is a flowchart an example of a method of operating a scheduler according to an embodiment.

FIG. 5 shows a method 90 of operating a scheduler. The method 90 may generally be implemented in a scheduler such as, for example, the scheduler 30 (FIG. 1), already discussed. More particularly, the method 90 may be implemented in one or more modules as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), FPGAs, complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 90 may be written in any combination of one or more programming languages, including an object-oriented programming language such as JAVA, SMALLTALK, C++ or the like and conventional procedural programming languages, such as the "C" programming language or similar programming languages. Additionally, logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 92 provides for identifying a prioritization data structure (e.g., PDT, MAT) associated with (e.g., dedicated to) a function, wherein the prioritization data structure lists hardware resource types in priority order. Block 92 may also include generating and/or modifying the prioritization data structure based on collected telemetry information. In this regard, block 92 may design the prioritization data structure to improve performance (e.g., by prioritizing high performance processors), reduce power consumption (e.g., by prioritizing low power processors), and so forth. Indeed, the mappings may even be time of day specific.

A type of hardware resource may be selected at block 94, where block 96 determines whether the selected hardware resource type is available. If so, the selected hardware resource type is allocated (e.g., assigned) to the function at block 98. If the selected hardware resource type is not available, the illustrated method 90 returns to block 94 and selects the next type of hardware resource in priority order.

Thus, if the type of resource having the highest priority in the prioritization data structure is available, that type of resource will be allocated to the function. Otherwise, a second type of hardware resource (in priority order) will be allocated to the function, wherein the second type of hardware resource is the next available type of hardware resource. As already noted, the hardware resource types may be processor types (e.g., in the case of a PDT) and/or memory types (e.g., in the case of an MAT). The illustrated method 90 therefore enhances performance, efficiency and/or scalability by enabling more optimal execution configurations to be automatically identified on a per function basis. Moreover, costly and time-consuming rewrites of application code may be avoided as new types of hardware resources are developed because the prioritization data structure may be updated over time.

Figure 6:
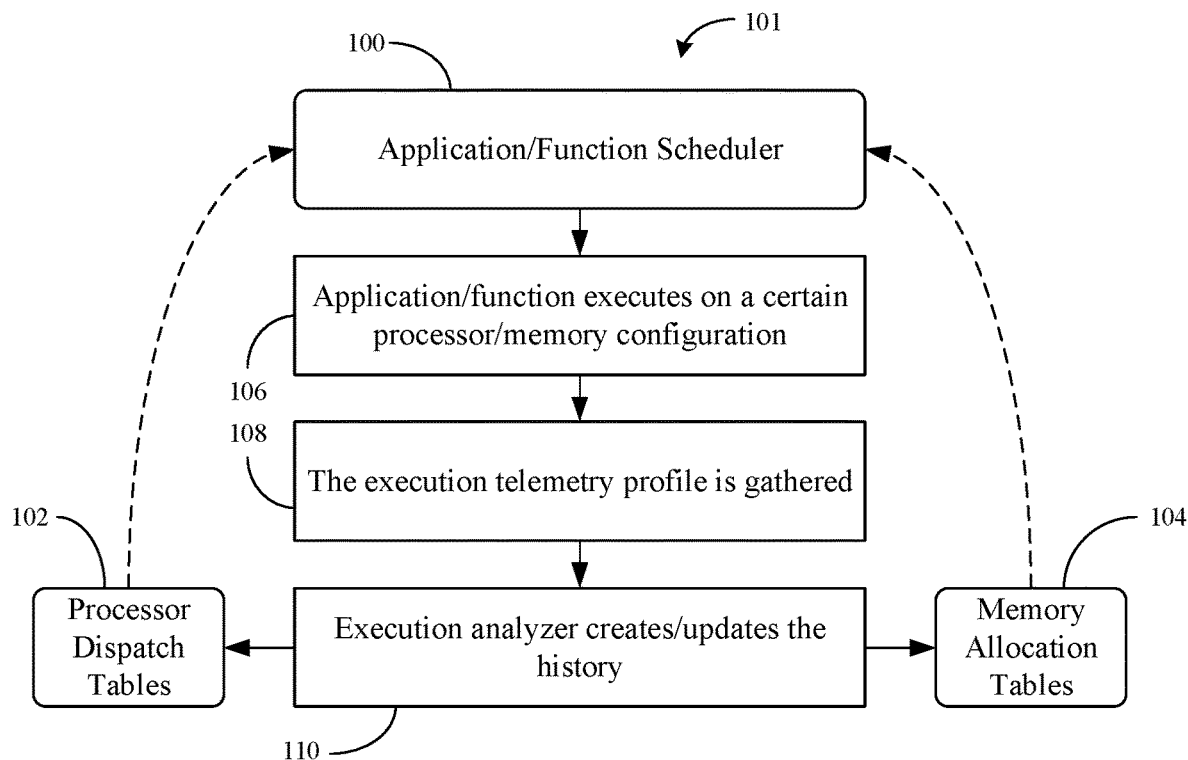
FIG. 6 is a flowchart of an example of a method of operating a performance-enhanced computing system according to an embodiment.

FIG. 6 shows a method 101 of operating a performance-enhanced computing system. The method 101 may be implemented in one or more modules as a set of logic instructions stored in a machine- or computer-readable storage medium such as RAM, ROM, PROM, firmware, flash memory, etc., in configurable logic such as, for example, PLAs, FPGAs, CPLDs, in fixed-functionality logic hardware using circuit technology such as, for example, ASIC, CMOS or TTL technology, or any combination thereof.

In general, an application/function scheduler 100 may leverage a global database of processor dispatch tables 102 and memory allocation tables 104 in configuring a function (or application) for execution and allocating memory for the function execution. In certain embodiments, new telemetry information about the execution is recorded for used by an agent that revises the PDTs 102 and MATs 104 based on the new information. For example, the application/function may execute on a certain processor/memory configuration at process block 106, where the execution telemetry profile is gathered (e.g., collected) at block 108. In an embodiment, an execution analyzer creates/updates the telemetry information (e.g., profile, history) at block 110. In the illustrated example, the telemetry information collection and prioritization data structure updates are repeated for multiple executions of the function.

Accordingly, the illustrated method 101 provides an automated learning solution to partitioning computer applications for heterogeneous systems (e.g., avoiding costly and time-consuming rewrites of application code). Additionally, the telemetry information may be stored to a different telemetry record for each execution of the function (see, e.g., FIG. 3A) or stored to the same telemetry record for each execution of the function (see, e.g., FIG. 3B). In an embodiment, the scheduler 100 generates and modifies the prioritization data structures based on the telemetry information.

Figure 7:
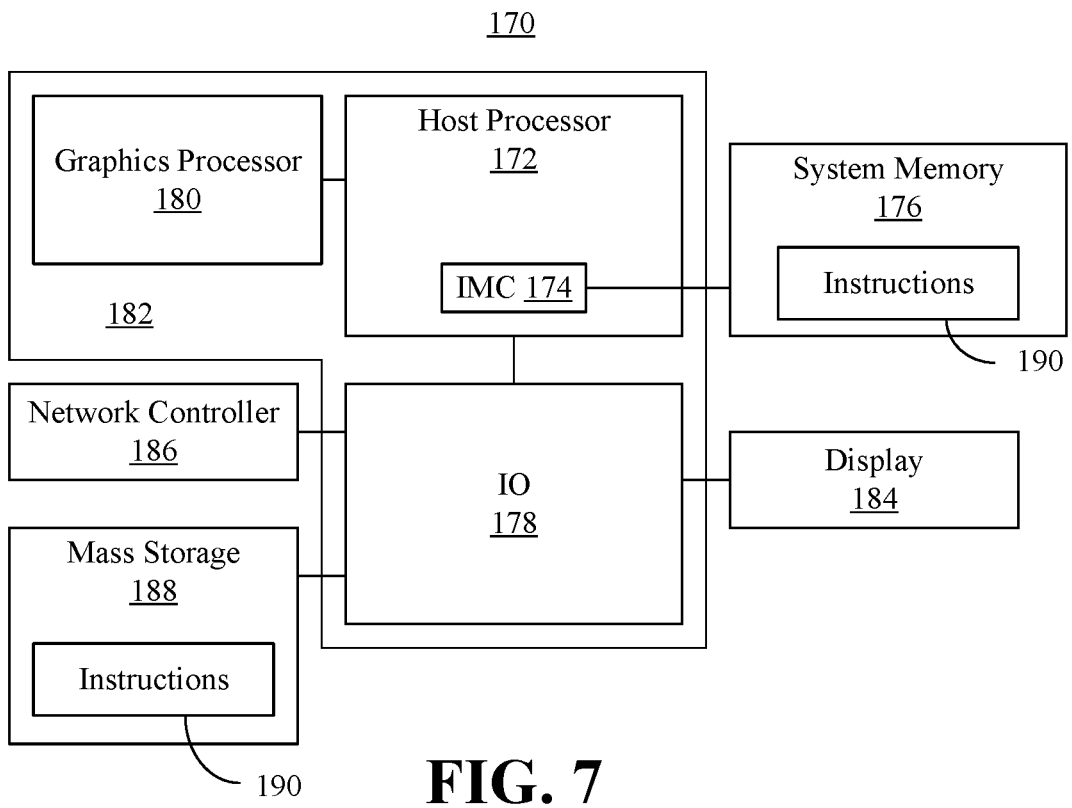
FIG. 7 is a block diagram of an example of a performance-enhanced computing system according to an embodiment.

Turning now to FIG. 7, a performance-enhanced computing system 170 is shown. The system 170 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 170 includes a host processor 172 having an integrated memory controller (IMC) 174 that is coupled to a system memory 176.

The illustrated system 170 also includes an input output (IO) module 178 implemented together with the host processor 172 and a graphics processor 180 on a semiconductor die 182 as a system on chip (SoC). The illustrated IO module 178 communicates with, for example, a display 184 (e.g., touch screen, liquid crystal display/LCD, light emitting diode/LED display), a network controller 186 (e.g., wired and/or wireless), and mass storage 188 (e.g., hard disk drive/HDD, optical disk, solid state drive/SSD, flash memory).

In an embodiment, the host processor 172, the graphics processor 180 and/or the IO module 178 execute program instructions 190 retrieved from the system memory 176 and/or the mass storage 188 to perform one or more aspects of the method 90 (FIG. 5) and/or the method 101 (FIG. 6), already discussed. Thus, execution of the illustrated instructions 190 may cause the computing system 170 to collect telemetry information during an execution of a function and generate a prioritization data structure based on the telemetry information, where the prioritization data structure lists hardware resource types in priority order. In one example, execution of the instructions 190 also causes the computing system 170 to collect telemetry information during a plurality of executions of the function and modify the prioritization data structure based on the telemetry information.

In an embodiment, execution of the illustrated instructions 190 also causes the computing system 170 to allocate a first type of hardware resource to the function if the first type of hardware resource is available, where the first type of hardware resource has the highest priority in the prioritization data structure. Additionally, execution of the instructions 190 may cause the computing system 170 to allocate, in the priority order, a second type of hardware resource to the function if the first type of hardware resource is not available. In an embodiment, the second type of hardware resource is the next available type of hardware resource. As already discussed, the hardware resource types may be processor types, memory types, and so forth. The computing system 170 is therefore performance-enhanced at least to the extent that it uses prioritization data structures to enable more optimal execution configurations to be automatically identified and used on a per function basis.

Figure 8:
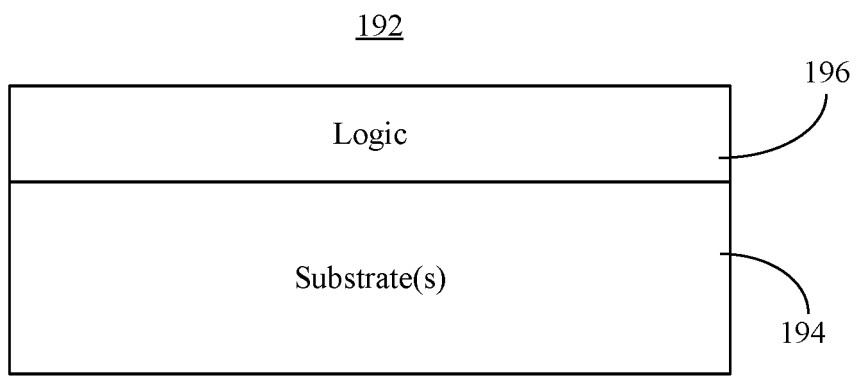
FIG. 8 is an illustration of an example of a semiconductor apparatus according to an embodiment.

FIG. 8 shows a semiconductor package apparatus 192. The illustrated apparatus 192 includes one or more substrates 194 (e.g., silicon, sapphire, gallium arsenide) and logic 196 (e.g., transistor array and other integrated circuit/IC components) coupled to the substrate(s) 194. The logic 196 may be implemented at least partly in configurable logic or fixed-functionality logic hardware. In one example, the logic 196 implements one or more aspects of the method 90 (FIG. 5) and/or the method 101 (FIG. 6), already discussed. Thus, the logic 196 may collect telemetry information during an execution of a function and generate a prioritization data structure based on the telemetry information, where the prioritization data structure lists hardware resource types in priority order. In one example, the logic 196 also collects telemetry information during a plurality of executions of the function and modifies the prioritization data structure based on the telemetry information.

In an embodiment, the logic 196 allocates a first type of hardware resource to the function if the first type of hardware resource is available, where the first type of hardware resource has the highest priority in the prioritization data structure. Additionally, the logic 196 may allocate, in the priority order, a second type of hardware resource to the function if the first type of hardware resource is not available. In one example, the second type of hardware resource is the next available type of hardware resource. As already discussed, the hardware resource types may be processor types, memory types, and so forth. The apparatus 192 is therefore performance-enhanced at least to the extent that it uses prioritization data structures to enable more optimal execution configurations to be automatically identified and used on a per function basis.

In one example, the logic 196 includes transistor channel regions that are positioned (e.g., embedded) within the substrate(s) 194. Thus, the interface between the logic 196 and the substrate(s) 194 may not be an abrupt junction. The logic 196 may also be considered to include an epitaxial layer that is grown on an initial wafer of the substrate(s) 194.

Figure 9:
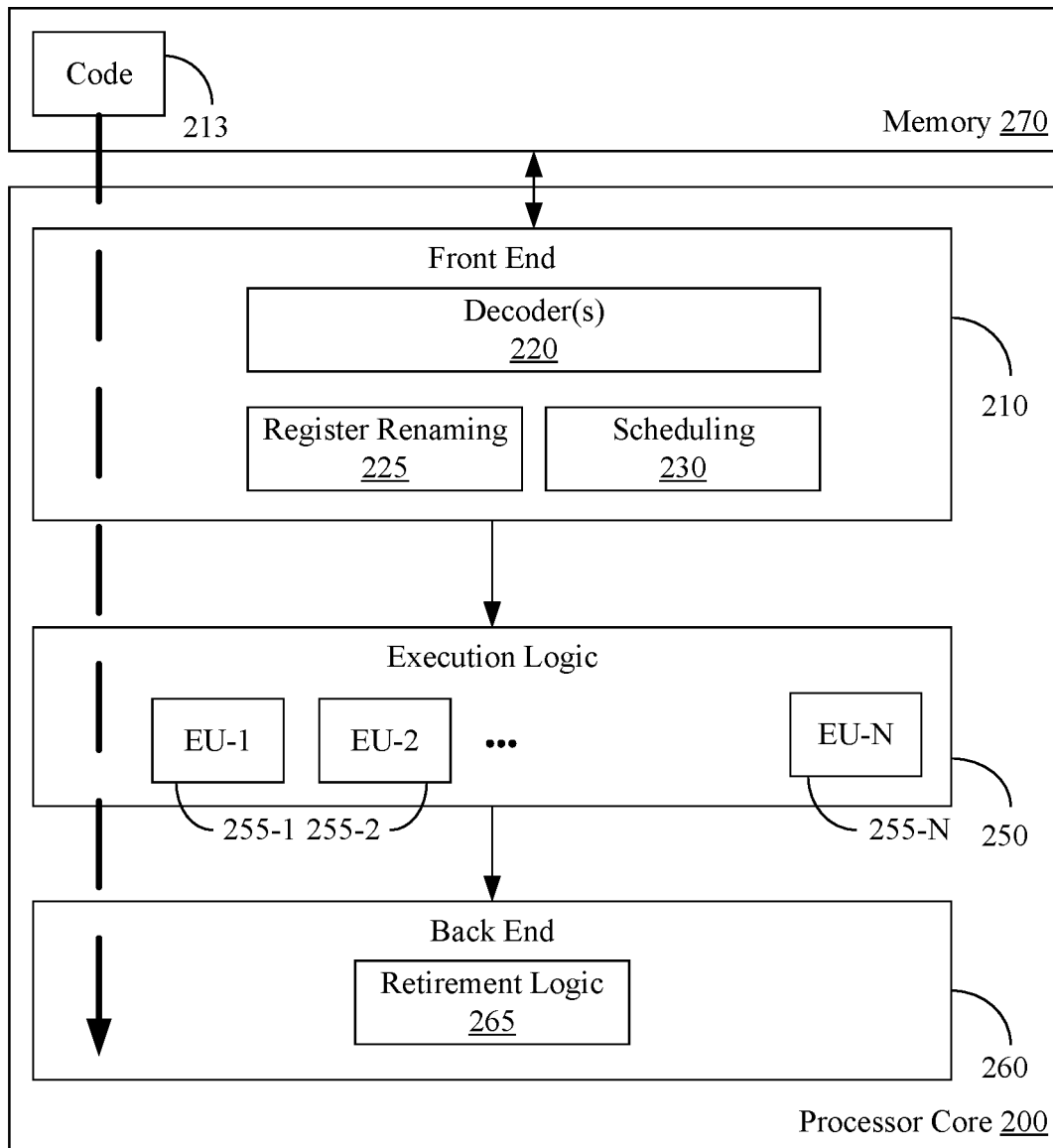
FIG. 9 is a block diagram of an example of a processor according to an embodiment.

FIG. 9 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 9, a processing element may alternatively include more than one of the processor core 200 illustrated in FIG. 9. The processor core 200 may be a single-threaded core or, for at least one embodiment, the processor core 200 may be multithreaded in that it may include more than one hardware thread context (or "logical processor") per core.

FIG. 9 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement one or more aspects of the method 90 (FIG. 5) and/or the method 101 (FIG. 6), already discussed. The processor core 200 follows a program sequence of instructions indicated by the code 213. Each instruction may enter a front-end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front-end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 9, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Figure 10:
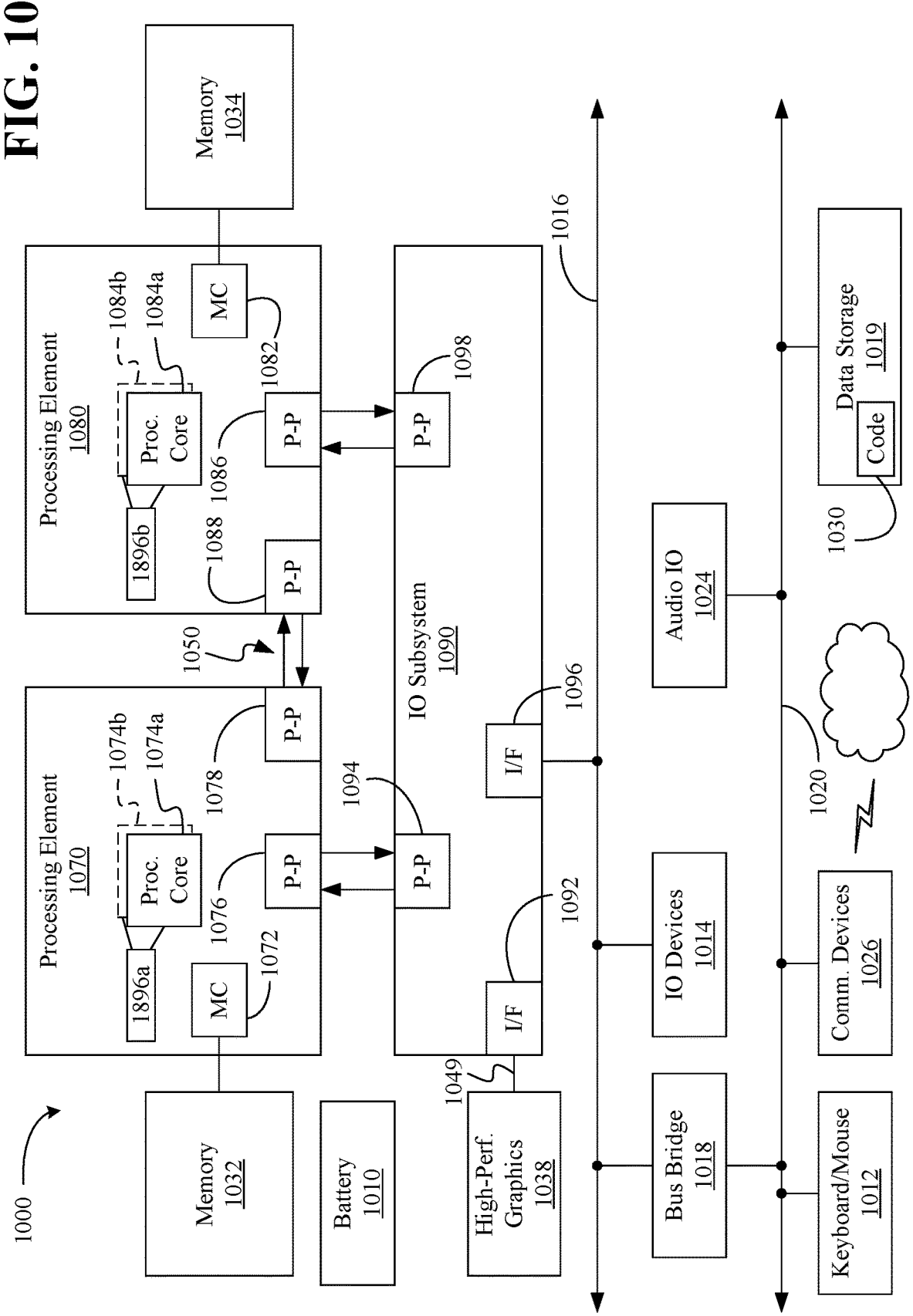
FIG. 10 is a block diagram of an example of a multi-processor based computing system according to an embodiment.

Referring now to FIG. 10, shown is a block diagram of a computing system 1000 embodiment in accordance with an embodiment. Shown in FIG. 10 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 10 may be implemented as a multi-drop bus rather than point-to-point interconnect.

As shown in FIG. 10, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 9.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 10, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 10, the I/O subsystem 1090 includes P-P interfaces 1094 and 1098. Furthermore, I/O subsystem 1090 includes an interface 1092 to couple I/O subsystem 1090 with a high-performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 10, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement one or more aspects of the method 90 (FIG. 5) and/or the method 101 (FIG. 6), already discussed. Further, an audio I/O 1024 may be coupled to second bus 1020 and a battery 1010 may supply power to the computing system 1000.

Note that other embodiments are contemplated. For example, instead of the point-to-point architecture of FIG. 10, a system may implement a multi-drop bus or another such communication topology. Also, the elements of FIG. 10 may alternatively be partitioned using more or fewer integrated chips than shown in FIG. 10.

Additional Notes and Examples

Example 1 includes a performance-enhanced computing system comprising a network controller, a processor coupled to the network controller, and a memory coupled to the processor, the memory including a set of executable program instructions, which when executed by the processor, cause the computing system to identify a prioritization data structure associated with a function, wherein the prioritization data structure lists hardware resource types in priority order, allocate a first type of hardware resource to the function if the first type of hardware resource is available, wherein the first type of hardware resource has a highest priority in the prioritization data structure, and allocate, in priority order, a second type of hardware resource to the function if the first type of hardware resource is not available, wherein the hardware resource types are one of processor types or memory types.

Example 2 includes the computing system of Example 1, wherein the instructions, when executed, cause the computing system to collect telemetry information during an execution of the function, and generate the prioritization data structure based on the telemetry information, wherein the second type of hardware resource is to be a next available type of hardware resource, wherein the telemetry information is to include one or more of a parameter size and value, a memory requirement, an execution time, a number of threads, or a power consumption, and wherein the prioritization data structure is to be one of a processor dispatch table or a memory allocation table.

Example 3 includes the computing system of Example 1, wherein the instructions, when executed, cause the computing system to collect telemetry information during a plurality of executions of the function, and modify the prioritization data structure based on the telemetry information.

Example 4 includes the computing system of Example 3, wherein the instructions, when executed, cause the computing system to store first telemetry information to a first telemetry record, wherein the first telemetry information is associated with a first execution of the function, and store second telemetry information to a second telemetry record, wherein the second telemetry information is associated with a second execution of the function.

Example 5 includes the computing system of Example 3, wherein the instructions, when executed, cause the computing system to store first telemetry information to a telemetry record, wherein the first telemetry information is associated with a first execution of the function, and store second telemetry information to the telemetry record, wherein the second telemetry information is associated with a second execution of the function.

Example 6 includes a semiconductor apparatus comprising one or more substrates, and logic coupled to the one or more substrates, wherein the logic is implemented at least partly in one or more of configurable logic or fixed-functionality hardware logic, the logic coupled to the one or more substrates to identify a prioritization data structure associated with a function, wherein the prioritization data structure lists hardware resource types in priority order, allocate a first type of hardware resource to the function if the first type of hardware resource is available, wherein the first type of hardware resource has a highest priority in the prioritization data structure, and allocate, in the priority order, a second type of hardware resource to the function if the first type of hardware resource is not available.

Example 7 includes the semiconductor apparatus of Example 6, wherein the logic coupled to the one or more substrates is to collect telemetry information during an execution of the function, and generate the prioritization data structure based on the telemetry information, wherein the second type of hardware resource is to be a next available type of hardware resource, wherein the telemetry information is to include one or more of a parameter size and value, a memory requirement, an execution time, a number of threads, or a power consumption, and wherein the prioritization data structure is to be one of a processor dispatch table or a memory allocation table.

Example 8 includes the semiconductor apparatus of Example 6, wherein the logic coupled to the one or more substrates is to collect telemetry information during a plurality of executions of the function, and modify the prioritization data structure based on the telemetry information.

Example 9 includes the semiconductor apparatus of Example 8, wherein the logic coupled to the one or more substrates is to store first telemetry information to a first telemetry record, wherein the first telemetry information is associated with a first execution of the function, and store second telemetry information to a second telemetry record, wherein the second telemetry information is associated with a second execution of the function.

Example 10 includes the semiconductor apparatus of Example 8, wherein the logic coupled to the one or more substrates is to store first telemetry information to a telemetry record, wherein the first telemetry information is associated with a first execution of the function, and store second telemetry information to the telemetry record, wherein the second telemetry information is associated with a second execution of the function.

Example 11 includes the semiconductor apparatus of any one of Examples 6 to 10, wherein the hardware resource types are processor types.

Example 12 includes the semiconductor apparatus of any one of Examples 6 to 10, wherein the hardware resource types are memory types.

Example 13 includes at least one computer readable storage medium comprising a set of executable program instructions, which when executed by a computing system, cause the computing system to identify a prioritization data structure associated with a function, wherein the prioritization data structure lists hardware resource types in priority order, allocate a first type of hardware resource to the function if the first type of hardware resource is available, wherein the first type of hardware resource has a highest priority in the prioritization data structure, and allocate, in the priority order, a second type of hardware resource to the function if the first type of hardware resource is not available.

Example 14 includes the at least one computer readable storage medium of Example 13, wherein the instructions, when executed, cause the computing system to collect telemetry information during an execution of the function, and generate the prioritization data structure based on the telemetry information, wherein the second type of hardware resource is to be a next available type of hardware resource, wherein the telemetry information is to include one or more of a parameter size and value, a memory requirement, an execution time, a number of threads, or a power consumption, and wherein the prioritization data structure is to be one of a processor dispatch table or a memory allocation table.

Example 15 includes the at least one computer readable storage medium of Example 13, wherein the instructions, when executed, cause the computing system to collect telemetry information during a plurality of executions of the function, and modify the prioritization data structure based on the telemetry information.

Example 16 includes the at least one computer readable storage medium of Example 15, wherein the instructions, when executed, cause the computing system to store first telemetry information to a first telemetry record, wherein the first telemetry information is associated with a first execution of the function, and store second telemetry information to a second telemetry record, wherein the second telemetry information is associated with a second execution of the function.

Example 17 includes the at least one computer readable storage medium of Example 15, wherein the instructions, when executed, cause the computing system to store first telemetry information to a telemetry record, wherein the first telemetry information is associated with a first execution of the function, and store second telemetry information to the telemetry record, wherein the second telemetry information is associated with a second execution of the function.

Example 18 includes the at least one computer readable storage medium of any one of Examples 13 to 17, wherein the hardware resource types are processor types.

Example 19 includes the at least one computer readable storage medium of any one of Examples 13 to 17, wherein the hardware resource types are memory types.

Example 20 includes a method of operating a performance-enhanced computing system, the method comprising identifying a prioritization data structure associated with a function, wherein the prioritization data structure lists hardware resource types in priority order, allocating a first type of hardware resource to the function if the first type of hardware resource is available, wherein the first type of hardware resource has a highest priority in the prioritization data structure, and allocating, in the priority order, a second type of hardware resource to the function if the first type of hardware resource is not available, wherein the hardware resource types are one of processor types or memory types.

Example 21 includes the method of Example 20, further comprising collecting telemetry information during an execution of the function, and generating the prioritization data structure based on the telemetry information, wherein the second type of hardware resource is a next available type of hardware resource, wherein the telemetry information includes one or more of a parameter size and value, a memory requirement, an execution time, a number of threads, or a power consumption, and wherein the prioritization data structure is one of a processor dispatch table or a memory allocation table.

Example 22 includes the method of Example 21, further including collecting telemetry information during a plurality of executions of the function, and modifying the prioritization data structure based on the telemetry information.

Example 23 includes the method of Example 22, further including storing first telemetry information to a first telemetry record, wherein the first telemetry information is associated with a first execution of the function, and storing second telemetry information to a second telemetry record, wherein the second telemetry information is associated with a second execution of the function.

Example 24 includes the method of Example 22, further including storing first telemetry information to a telemetry record, wherein the first telemetry information is associated with a first execution of the function, and storing second telemetry information to the telemetry record, wherein the second telemetry information is associated with a second execution of the function.

Example 25 includes means for performing the method of any one of Examples 20 to 24.

Thus, technology described herein enables the design of systems that automatically partition computer applications for heterogeneous computer systems including CPUs, GPUS, FPGAs, and other special accelerators and heterogeneous tiered memory subsystems. The technology is based on a unified programming model such as, for example, ONEAPI, that can be mapped to various compute and memory types. The technology may also be used to design computer systems that are highly optimized for domain-specific applications or applications that have a particular Service-Level Agreement (SLA) in terms of latency, bandwidth, throughput, power consumption, and cost. The technology may use static a priori knowledge about performance characteristics of known algorithms, primitives, and codelets in addition to dynamic telemetry and profile feedback about the compute characteristics (e.g., performance, power) of the compute primitives. Accordingly, the technology may automatically partition computer applications to run on the best compute processor. The technology may also be used in an intelligent fashion in which the system learns as it runs applications, resulting in a learning system for automatic application partitioning. In addition, the technology described herein may reduce time to market (TTM), which may be directly dependent on the ease of programming. The technology also enables the development of compute platforms that meet their compute and cost requirements.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the computing system within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A; B; C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A computing system comprising:
a network controller;
a processor coupled to the network controller; and
a memory coupled to the processor, the memory including a set of executable program instructions, which when executed by the processor, cause the computing system to:
identify a prioritization data structure associated with a function, wherein the prioritization data structure lists hardware resource types in priority order;
allocate a first type of hardware resource to the function if the first type of hardware resource is available, wherein the first type of hardware resource has a highest priority in the prioritization data structure; and
allocate, in the priority order, a second type of hardware resource to the function if the first type of hardware resource is not available, wherein the hardware resource types are one of processor types or memory types.

2. The computing system of claim 1, wherein the instructions, when executed, cause the computing system to:
collect telemetry information during an execution of the function; and
generate the prioritization data structure based on the telemetry information, wherein the second type of hardware resource is to be a next available type of hardware resource, wherein the telemetry information is to include one or more of a parameter size and value, a memory requirement, an execution time, a number of threads, or a power consumption, and wherein the prioritization data structure is to be one of a processor dispatch table or a memory allocation table.

3. The computing system of claim 1, wherein the instructions, when executed, cause the computing system to:
collect telemetry information during a plurality of executions of the function; and
modify the prioritization data structure based on the telemetry information.

4. The computing system of claim 3, wherein the instructions, when executed, cause the computing system to:
store first telemetry information to a first telemetry record, wherein the first telemetry information is associated with a first execution of the function; and
store second telemetry information to a second telemetry record, wherein the second telemetry information is associated with a second execution of the function.

5. The computing system of claim 3, wherein the instructions, when executed, cause the computing system to:
store first telemetry information to a telemetry record, wherein the first telemetry information is associated with a first execution of the function; and
store second telemetry information to the telemetry record, wherein the second telemetry information is associated with a second execution of the function.

6. A semiconductor apparatus comprising:
one or more substrates; and
logic coupled to the one or more substrates, wherein the logic is implemented at least partly in one or more of configurable logic or fixed-functionality hardware logic, the logic coupled to the one or more substrates to:

identify a prioritization data structure associated with a function, wherein the prioritization data structure lists hardware resource types in priority order;
allocate a first type of hardware resource to the function if the first type of hardware resource is available, wherein the first type of hardware resource has a highest priority in the prioritization data structure; and
allocate, in the priority order, a second type of hardware resource to the function if the first type of hardware resource is not available.

7. The semiconductor apparatus of claim 6, wherein the logic coupled to the one or more substrates is to:
collect telemetry information during an execution of the function; and
generate the prioritization data structure based on the telemetry information, wherein the second type of hardware resource is to be a next available type of hardware resource, wherein the telemetry information is to include one or more of a parameter size and value, a memory requirement, an execution time, a number of threads, or a power consumption, and wherein the prioritization data structure is to be one of a processor dispatch table or a memory allocation table.

8. The semiconductor apparatus of claim 6, wherein the logic coupled to the one or more substrates is to:
collect telemetry information during a plurality of executions of the function; and
modify the prioritization data structure based on the telemetry information.

9. The semiconductor apparatus of claim 8, wherein the logic coupled to the one or more substrates is to:
store first telemetry information to a first telemetry record, wherein the first telemetry information is associated with a first execution of the function; and
store second telemetry information to a second telemetry record, wherein the second telemetry information is associated with a second execution of the function.

10. The semiconductor apparatus of claim 8, wherein the logic coupled to the one or more substrates is to:
store first telemetry information to a telemetry record, wherein the first telemetry information is associated with a first execution of the function; and
store second telemetry information to the telemetry record, wherein the second telemetry information is associated with a second execution of the function.

11. The semiconductor apparatus of claim 6, wherein the hardware resource types are processor types.

12. The semiconductor apparatus of claim 6, wherein the hardware resource types are memory types.

13. At least one non-transitory computer readable storage medium comprising a set of executable program instructions, which when executed by a computing system, cause the computing system to: identify a prioritization data structure associated with a function, wherein the prioritization data structure lists hardware resource types in priority order; allocate a first type of hardware resource to the function if the first type of hardware resource is available, wherein the first type of hardware resource has a highest priority in the prioritization data structure; and allocate, in the priority order, a second type of hardware resource to the function if the first type of hardware resource is not available.

14. The at least one non-transitory computer readable storage medium of claim 13, wherein the instructions, when executed, cause the computing system to: collect telemetry information during an execution of the function; and generate the prioritization data structure based on the telemetry information, wherein the second type of hardware resource is to be a next available type of hardware resource, wherein the telemetry information is to include one or more of a parameter size and value, a memory requirement, an execution time, a number of threads, or a power consumption, and wherein the prioritization data structure is to be one of a processor dispatch table or a memory allocation table.

15. The at least one non-transitory computer readable storage medium of claim 13, wherein the instructions, when executed, cause the computing system to: collect telemetry information during a plurality of executions of the function; and modify the prioritization data structure based on the telemetry information.

16. The at least one non-transitory computer readable storage medium of claim 15, wherein the instructions, when executed, cause the computing system to: store first telemetry information to a first telemetry record, wherein the first telemetry information is associated with a first execution of the function; and store second telemetry information to a second telemetry record, wherein the second telemetry information is associated with a second execution of the function.

17. The at least one non-transitory computer readable storage medium of claim 15, wherein the instructions, when executed, cause the computing system to: store first telemetry information to a telemetry record, wherein the first telemetry information is associated with a first execution of the function; and store second telemetry information to the telemetry record, wherein the second telemetry information is associated with a second execution of the function.

18. The at least one non-transitory computer readable storage medium of claim 13, wherein the hardware resource types are processor types.

19. The at least one non-transitory computer readable storage medium of claim 13, wherein the hardware resource types are memory types.

20. A method comprising:
identifying a prioritization data structure associated with a function, wherein the prioritization data structure lists hardware resource types in priority order;
allocating a first type of hardware resource to the function if the first type of hardware resource is available, wherein the first type of hardware resource has a highest priority in the prioritization data structure; and
allocating, in the priority order, a second type of hardware resource to the function if the first type of hardware resource is not available, wherein the hardware resource types are one of processor types or memory types.

21. The method of claim 20, further comprising:
collecting telemetry information during an execution of the function; and
generating the prioritization data structure based on the telemetry information, wherein the second type of hardware resource is a next available type of hardware resource, wherein the telemetry information includes one or more of a parameter size and value, a memory requirement, an execution time, a number of threads, or a power consumption, and wherein the prioritization data structure is one of a processor dispatch table or a memory allocation table.

22. The method of claim 21, further including:
collecting telemetry information during a plurality of executions of the function; and
modifying the prioritization data structure based on the telemetry information.

23. The method of claim 22, further including:
  storing first telemetry information to a first telemetry record, wherein the first telemetry information is associated with a first execution of the function; and
  storing second telemetry information to a second telemetry record, wherein the second telemetry information is associated with a second execution of the function.

24. The method of claim 22, further including:
  storing first telemetry information to a telemetry record, wherein the first telemetry information is associated with a first execution of the function; and
  storing second telemetry information to the telemetry record, wherein the second telemetry information is associated with a second execution of the function.

* * * * *